United States Patent [19]

Bublitz

[11] Patent Number: 5,791,865

[45] Date of Patent: Aug. 11, 1998

[54] BAG PALLETIZER

[76] Inventor: Rod W. Bublitz, 700 W. Nebobish Rd., Essexville, Mich. 48732

[21] Appl. No.: 713,784

[22] Filed: Sep. 13, 1996

[51] Int. Cl.⁶ .................................................. B65G 59/02
[52] U.S. Cl. .................... 414/794.4; 414/730; 414/788.9
[58] Field of Search ............................ 198/458; 414/788, 414/788.9, 789.9, 793.8, 799, 924, 930, 927

[56] References Cited

U.S. PATENT DOCUMENTS

| | | | |
|---|---|---|---|
| 2,773,607 | 12/1956 | Locke. | |
| 3,137,286 | 6/1964 | Raynor | 414/930 |
| 3,219,203 | 11/1965 | Jeremiah | 414/900 |
| 3,669,282 | 6/1972 | Carlson | 414/930 |
| 3,688,920 | 9/1972 | Frish | 414/900 |
| 3,918,598 | 11/1975 | VanderMeer et al. . | |
| 4,073,388 | 2/1978 | Carter | 414/930 |
| 4,311,425 | 1/1982 | Pulda | 414/930 |
| 4,927,321 | 5/1990 | Lucas | 414/788.9 |
| 5,073,081 | 12/1991 | Johnson | 414/786 |
| 5,170,877 | 12/1992 | Francioni | 198/358 |
| 5,261,781 | 11/1993 | Bandy | 414/791.6 |
| 5,375,967 | 12/1994 | Rathert | 414/789.5 |

FOREIGN PATENT DOCUMENTS

| | | |
|---|---|---|
| 55-61536 | 6/1980 | Japan. |
| 58-16243 | 9/1983 | Japan. |
| 8801528A | 1/1990 | Netherlands. |

Primary Examiner—Karen M. Young
Assistant Examiner—Gregory A. Morse
Attorney, Agent, or Firm—Reising, Ethington Learman & McCulloch, PLLC

[57] ABSTRACT

A bag palletizer has a frame equipped with two tier guides, two pallet lift mechanisms, two stacker work stations, and a lift control at each work station. A belt conveyor delivers bagged articles successively to both work stations. A pallet is supported on each pallet lift mechanism and raised until it abuts the bottom surface of the associated tier guide. Bags are manually removed from the conveyor and placed atop the pallets to form a lowermost tier on each pallet. After each lowermost tier is formed, the pallets are lowered by the respective lift mechanisms the height of one tier to provide sufficient space in the tier guides to form another tier atop the lowermost tier. These steps are repeated until a selected number of tiers are stacked atop each pallet at which time each pallet and its stack of bags are removed.

9 Claims, 4 Drawing Sheets

BAG PALLETIZER

This invention relates to a bag palletizer and more particularly to an apparatus for palletizing bags of potatoes or other products.

BACKGROUND OF THE INVENTION

Mature potatoes are removed from the ground by a potato digger, transported to a washer, and conveyed to a bagger for weighing and bagging. The bags of potatoes are palletized as they leave the bagger. Following palletizing, the potatoes are transported to market or to storage.

The potato washing, bagging, and palletizing operations often take place on the farm where the potatoes were grown. The machines used for washing, bagging, and palletizing are used once a year during the potato harvest and are idle the rest of the time. Due to the limited period of use, on all but the largest farms, the washing, bagging and palletizing operations are labor intensive and the machines employed have minimal automation. Bagging machines, for example, merely dispense potatoes to a bag and weigh the bag. Empty bags are often supplied to the bagger manually. After the bags are filled, they go to a sewing machine that sews the bags shut. Bags are frequently fed to the sewing machine manually.

After bags of potatoes are sewn shut they are conveyed to a palletizer station. A palletizer station often consists of a pallet on the floor and a movable frame that rests on the floor and contacts three sides of the pallet, leaving the fourth side of the pallet open. One or two stackers receive bags of potatoes from the sewing machine and manually stack the bags on the pallet to form a plurality of tiers. The tiers of bags placed on the pallet generally project beyond the edges of the pallet when the movable frame is removed. The sides of the stack of bags on the open side of the pallet tend to be uneven and lean inward toward the center of the pallet or outward away from the center of the pallet.

Stacking bags on the pallet requires the stackers to bend over and lower bags into position in forming the lower tiers and to lift bags upward during placement of bags to form the top tiers. When one pallet is loaded it may be necessary to stop the sewing machine and the bagging operation while an empty pallet is moved into position. Such stoppages adversely affect the production rate of the bagging operation.

Pallets with portions of bags projecting beyond the pallet sides often are difficult to move into a van type vehicle with a fork lift truck for subsequent transport from the farm. If parts of the bags extend too far past a side edge of a pallet it may be impossible to place two pallets side by side inside a van body. With the current palletizing system, the palletized bags on one or more pallets frequently fall over against another stack of palletized bags during transport. To unload the van when this happens, it is necessary to remove some pallets manually one bag at a time.

SUMMARY OF THE INVENTION

The invention comprises a machine for stacking bags on a pallet in a manner which ensures that the sides of the stack of bags are substantially vertical and that bags do not extend beyond the edges of the pallet. The machine reduces lifting and bending when manually stacking bags of potatoes. The invention also comprises an apparatus for bag palletizing that reduces the number of people required to operate the bag palletizing operation and increases the production rate.

The bag palletizer includes a frame that supports two elevated stacking guides. A first lift assembly lifts a pallet up to the level of the first stacking guide. A second lift assembly lifts a pallet up to the level of the second stacking guide.

Work stations are provided at opposite ends of the frame. A stacker on one of the work stations moves bags of potatoes laterally from a bag delivery conveyor and places the bags in the adjacent stacking guide in a predetermined arrangement. As successive tiers of bags are formed the pallet is lowered. The stacker at the other work station moves bags laterally from the bag delivery conveyor and places them in the stacking guide adjacent to the other work station. As successive tiers of bags are completed, the pallet is lowered by the second lift assembly in the same way the pallet on the first lift assembly is lowered.

The stackers take bags from the delivery conveyor so that, when one pallet is completely filled, the other pallet is only partially filled. That permits the stacker with the partially filled pallet to remove all the bags on the delivery conveyor while the loaded pallet is removed and replaced with an empty pallet. When two pallets are in position for loading, the two stackers can take every other bag from the delivery conveyor or one stacker can take all the bags until the pallet is filled. When one pallet is filled the stacker loading the other pallet should be ready to take all the bags on the delivery conveyor until the full pallet is replaced by an empty pallet.

THE DRAWINGS

The presently preferred embodiment of the invention is disclosed in the following description and in the accompanying drawings, wherein.

THE PREFERRED EMBODIMENT

Figure 1:
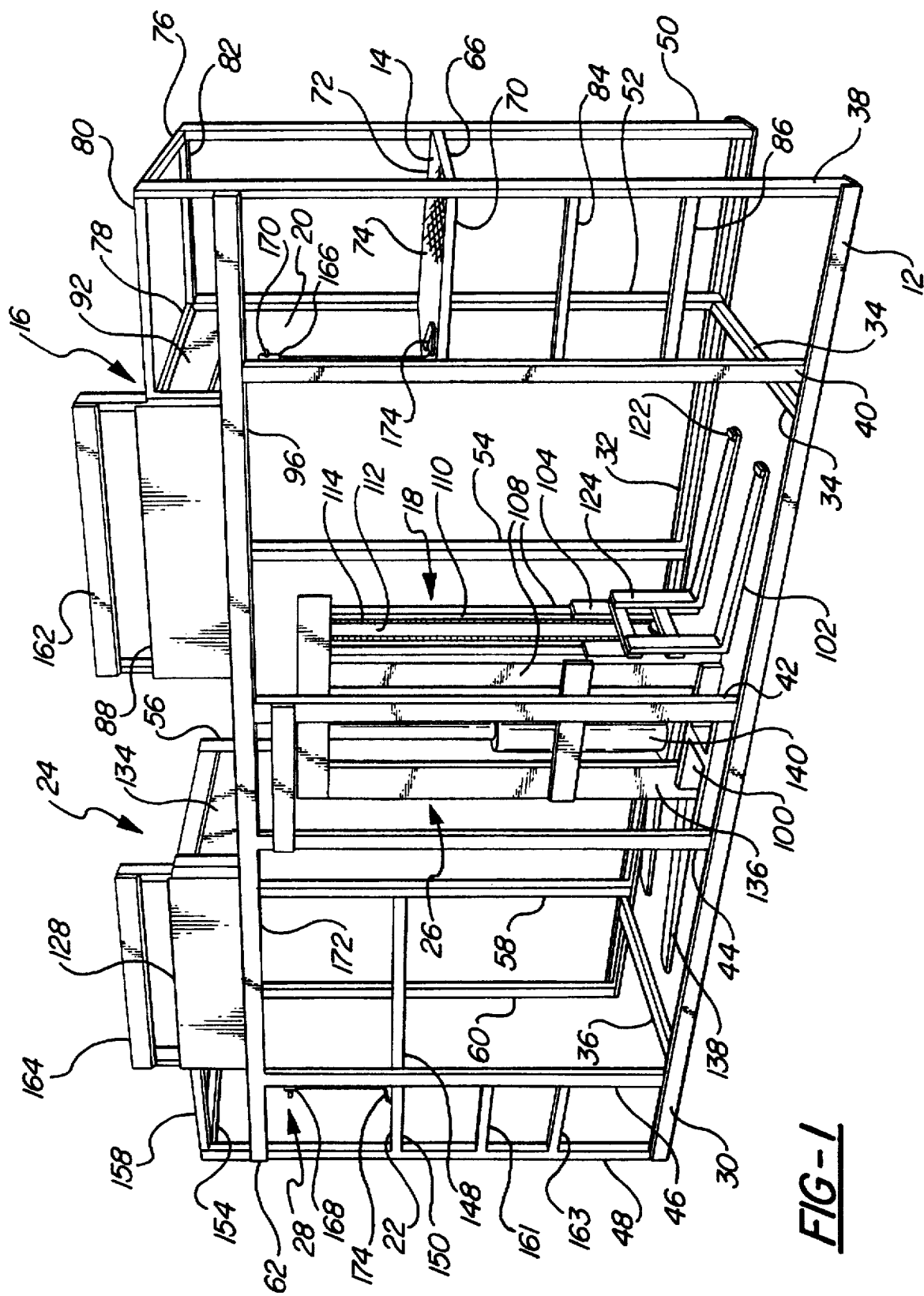
FIG. 1 is a perspective view of the bag palletizer with the bag delivery conveyor omitted.

The bag palletizer 10 has a frame 12 that supports a first bag stacker's work station 14, a fixed four-sided first bag stacking guide 16, a first pallet lift mechanism 18 and a first lift control 20. The bag palletizer 10 could be limited to one bag stacking guide 16 at a stacking zone and one pallet lift mechanism 18. However, to ensure continuous operation and brief rest periods for the individual bag stackers it is desirable to provide two bag palletizer stations. The bag palletizer 10 will therefore be described as including a second bag stacker's work station 22, a fixed second four-sided bag stacking guide 24 at a second stacking zone, a second pallet lift mechanism 26, and a second lift control 28.

The frame 12 includes a horizontal front base member 30 and a parallel rear base member 32 interconnected by transverse members 34 and 36. Front vertical uprights 38, 40, 42, 44, 46 and 48 are welded to the front base member 30. Rear vertical uprights 50, 52, 54, 56, 58 and 60 are welded to the rear base member 32. An upper front horizontal member 62 is welded to the tops of the front vertical uprights 38–48. An upper rear horizontal member 64 is welded to the rear vertical uprights 52–58.

The first bag stacker's work station 14 includes a horizontal cross member 66 welded to the uprights 38 and 50, a horizontal cross member 68 welded to the uprights 40 and 52, a front horizontal support 70 welded to the uprights 38 and 40, a rear horizontal support 72 welded to the uprights 50 and 52, and an expanded metal platform 74 secured to the horizontal members 66, 68, 70 and 72. Horizontal guard rails 76, 78, 80 and 82 keep a bag stacker from falling from the platform 74. Horizontal members 84 and 86 are steps for climbing to and descending from the platform 74.

The first bag stacking guide 16 defines a quadrangular enclosure that is open at its top and bottom and includes four walls, namely, a front wall 88, a rear wall 90 spaced from and parallel to the front wall 88, and spaced, parallel side walls 92 and 94. Inside surfaces of the walls 92 and 94 are spaced apart less than the width of the pallet P. The inside surfaces of the front wall 88 and the rear wall 90 are spaced apart less than the length of the pallet P. As a consequence, the open area of the stacking guide 16 is less than that of the pallet.

The bottom surfaces 96 of the walls 88–94 are in a common horizontal plane with the bottom surfaces of the horizontal members 62 and 64. The height of the walls 88–94 that constitute the stacking guide 16 is greater than the height of a filled bag B, and preferably between the height of 1½ and 2 times the height of a bag. The bag stacking guide 16 has sufficient vertical depth to accommodate not only a full tier of bags, but also provide lateral support for the next adjacent tier of bags. If the vertical height of the walls 88–94 exceeds the height of two tiers of bags it will necessitate the bag stacker's having to bend over excessively or damage the bags and contents if they are dropped too far.

The space under the bottom surface 96 of the first bag stacking guide 16 and between the uprights 40, 42, 52 and 54 defines a vertical travel shaft for a pallet P.

The first pallet lift mechanism 18 comprises a known tractor mounted forklift mast 98 that is rigidly attached to the base members 30 and 32 of the frame 12 by two H-shaped members 100. One of the H-shaped members 100 is adjacent the base member 30, as shown in FIG. 1, and the other H-shaped member (not shown) is adjacent the base member 32. Forks 102 are connected to a mast follower assembly 104 that is raised and lowered by one or more hydraulic cylinders 106.

The mast 98 is a known three section assembly having an outer fixed section 108 and two inner slidable sections 110 and 112. The hydraulic cylinder 106 is connected to the fixed section 108 and the slidable section 110. When the cylinder 106 is extended or retracted, it moves the slidable section 110 and chains 114 raise or lower the slidable section 112 and the mast follower 104. The forks 102 are raised a maximum distance of less than three meters. Two mast sections 108 and 110, or even a single mast section, can accommodate a three meter height. However, three section masts are available and provide a compact mast package.

Figure 4:
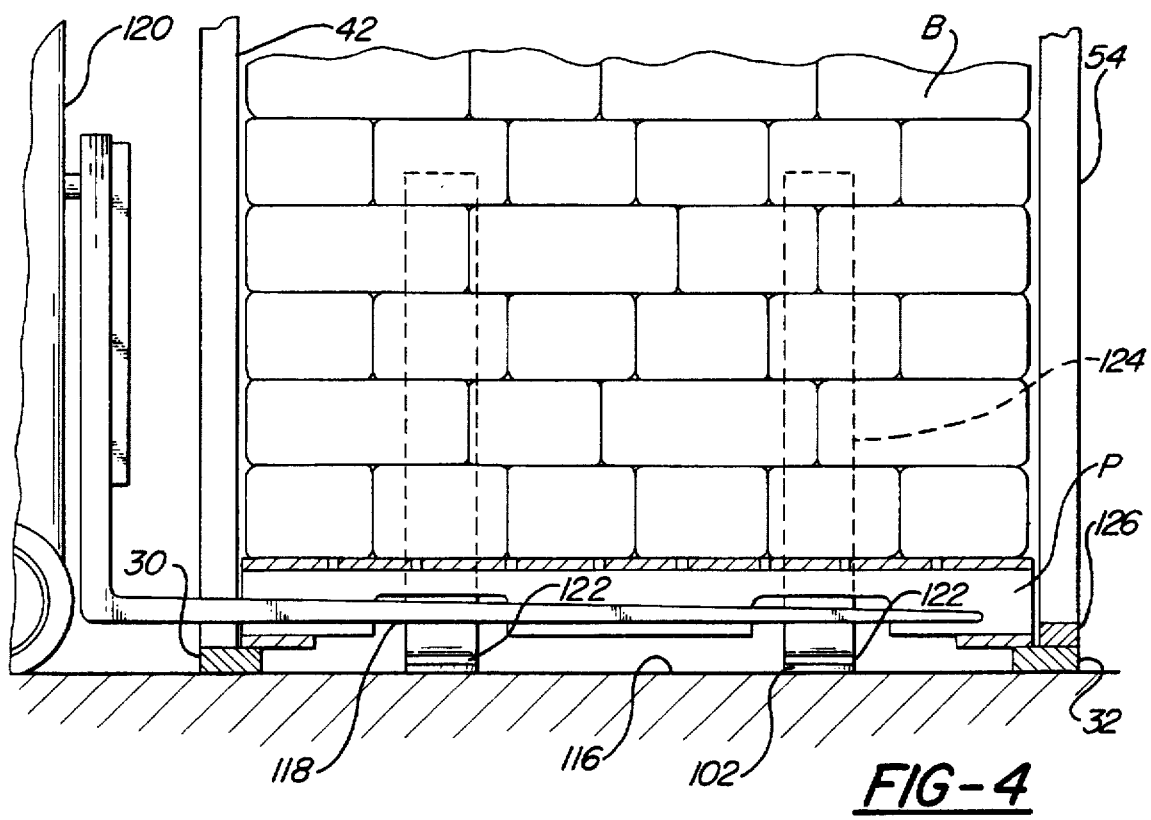
FIG. 4 is an enlarged sectional view taken along the line 4—4 of FIG. 2 with the upper portion broken away and showing a bag stacking pattern.

The forks 102 can be lowered into contact with the ground or other surface 116 that supports the frame 12. Since the base members 30 and 32 support the pallet P above the surface 116 when the forks 102 are in contact with the surface 116, there is more than adequate space for the forks 118 of a forklift truck 120 to move into position to lift the pallet P as shown in FIG. 4. The forklift truck 120 is then in position to lift the pallet P and the bags B and remove them from the bag palletizer 10. However, if desired, the pallet P could be supported on rollers and rolled into the bag palletizer 10 for loading and rolled out of the bag palletizer after the desired number of bags are stacked on the pallet.

The forks 102 position the pallet P relative to the side walls 92 and 94 of the bag stacking guide 16. Positioning blocks 122 can be attached to the forks 102 to ensure that a pallet remains adjacent the vertical portions 124 of the forks 102. A block 126 attached to the rear base member 32, as shown in FIG. 4, positions the pallet P relative to the front wall 88 and the rear wall 90 of the bag stacking guide 16.

Figure 2:
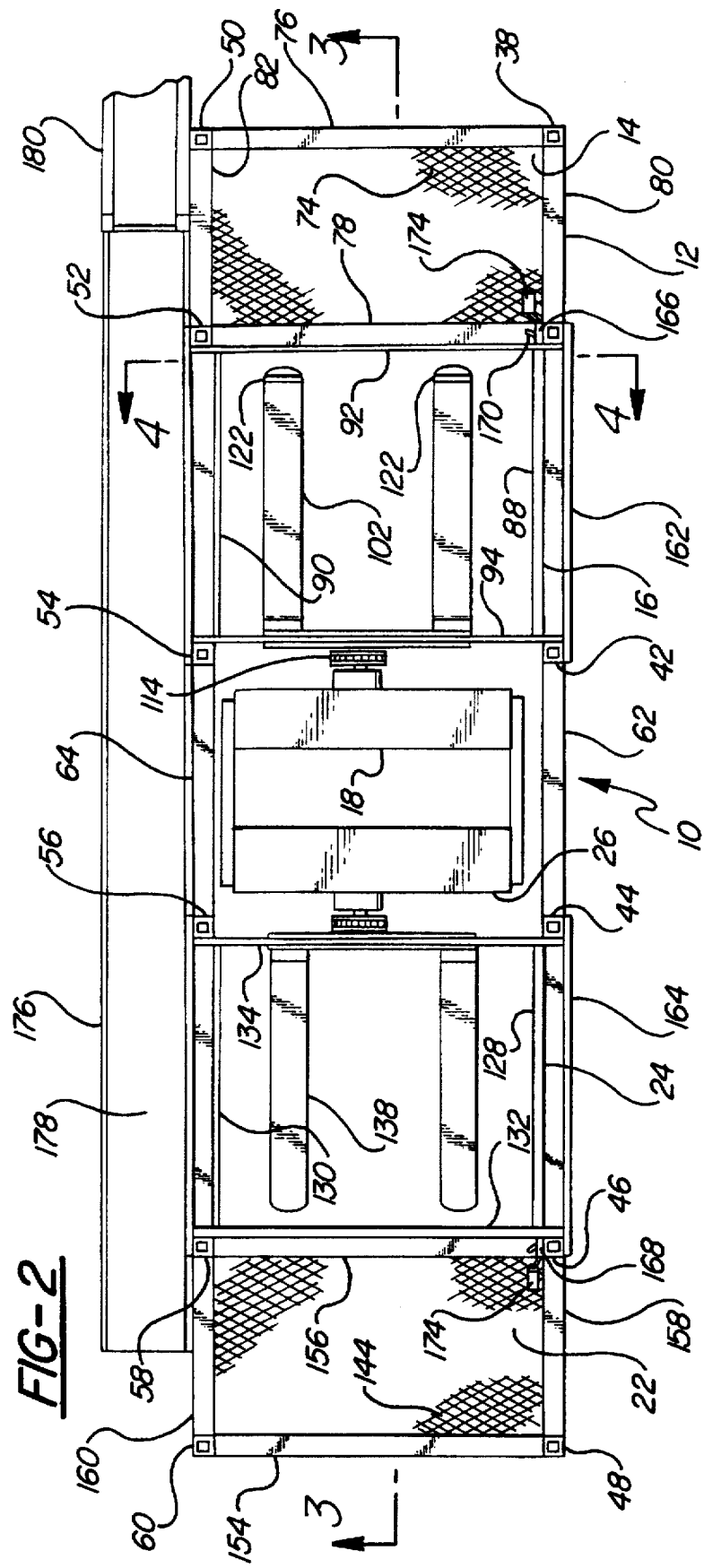
FIG. 2 is a top plan view of the bag palletizer including a bag delivery conveyor.
Figure 3:
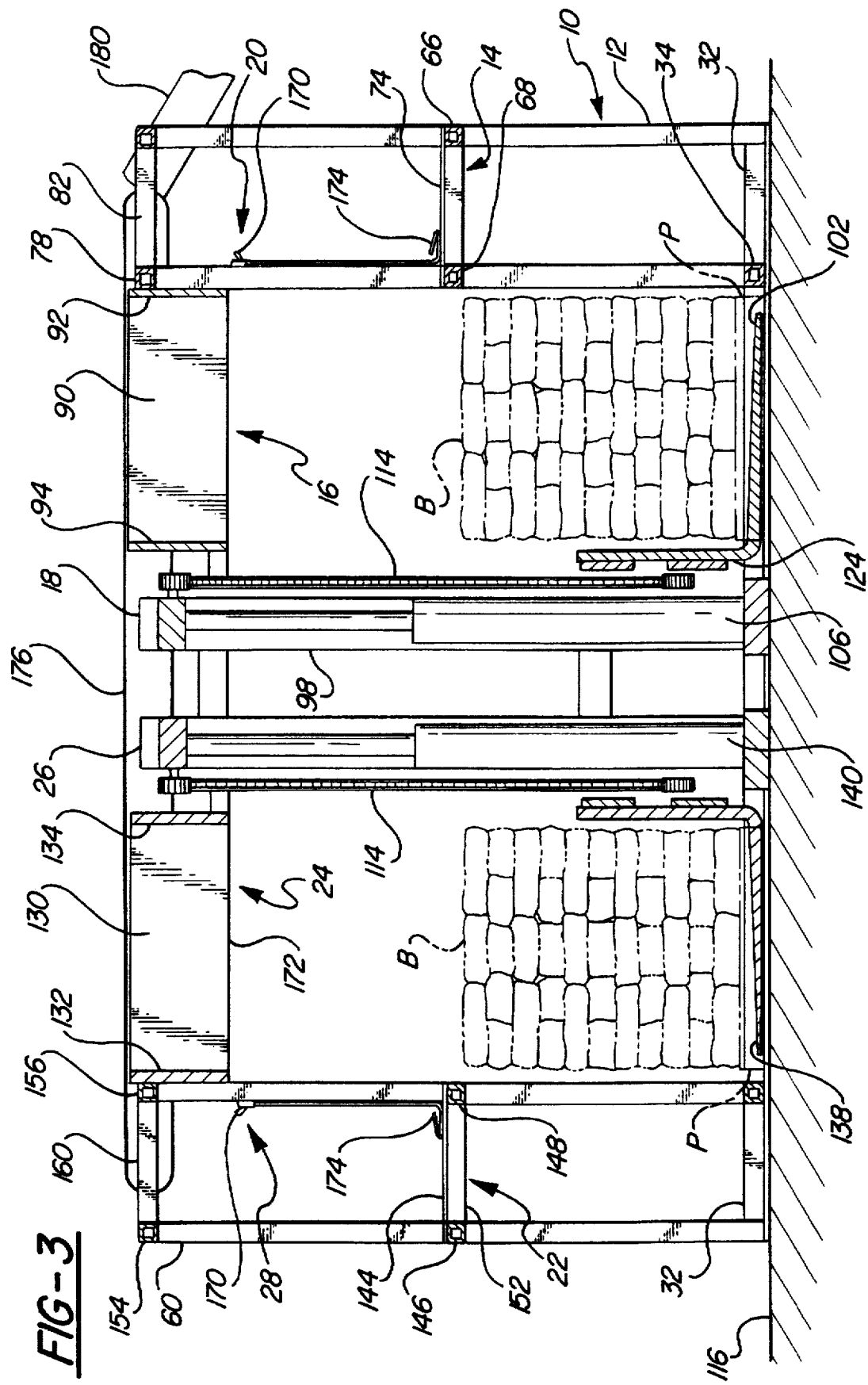
FIG. 3 is a sectional view taken along the line 3—3 of FIG. 2.

A second bag stacking guide 24, a second pallet lift mechanism 26, a second bag stacker work station 22, and a second lift control 28 are provided on the frame 12 as shown in FIGS. 1, 2, and 3. The second bag stacking guide 24, which corresponds to the first bag stacking guide 16, is attached to the upper front horizontal member 62 and the upper rear horizontal member 64. A space is provided between the facing side walls 94 and 134 of the first and second bag stacking guides 16 and 24 to accommodate the first and second pallet lift mechanisms 18 and 26.

The second pallet lift mechanism 26 has a mast assembly 136 attached to the H-shaped members 100 like the mast 98. Forks 138 of the second lift mechanism 26 extend outward under the second bag tier guide 24. A hydraulic cylinder 140 raises and lowers the forks 138. With the exception of being rotated 180° about a vertical axis, the second lift mechanism 26 is identical to the first lift mechanism 18.

The second bag stacker work station 22 includes an expanded metal platform 144 secured to horizontal cross members 146 and 148 and horizontal members 150 and 152 that are parallel to the front base member 30. Horizontal guard rails 154, 156, 158 and 160 keep a bag stacker from falling from the platform 144. Horizontal members 161 and 163 are steps for climbing to and descending from the platform 144.

Railings 162 and 164 are provided above the front walls 88 and 128 of the first and second bag stacking guides 16 and 24. These railings 162 and 164 prevent bags from accidentally falling on the operator of a fork lift truck 120. The railings 162 and 164 can also be used as a support by bag stackers when repositioning a bag at the intersections between the walls 88 and 94 or the walls 128 and 134 of the bag stacking guides 16 or 24.

Positioning of bags at the corners of tiers requires special care if they are to form a stable stack. A hydraulic pump, reservoir, and pump motor are required to supply hydraulic fluid under pressure to the hydraulic cylinders 106 and 140. A known hydraulic fluid supply source can be in a remote location and therefore is not shown in the drawings. The hydraulic system of most farm tractors or a compact electric motor, pump, and reservoir assembly are possible sources of the required hydraulic circuit.

The first lift control 20 includes a valve 166 mounted on the frame 12 in the first work station 14 that directs hydraulic fluid to and from the hydraulic cylinder 106. The second lift control 28 includes a valve 168 mounted on the frame 12 in the second work station 22 that directs hydraulic fluid to and from the hydraulic cylinder 140. The first and second control valves 166 and 168 are known valves. Both valves 166 and 168 have a control lever 170 that can be manually positioned to raise or lower a pallet P. Detents are provided in the valves 166 and 168 that can hold the levers 170 in a position to raise the pallet. These detents are automatically released when the pallet P being raised contacts the bottom surface 96 of the first bag stacking guide 16 or the bottom surface 172 of the second bag stacking guide 24. Foot operated levers 174 are connected to each of the control valves 166 and 168 for lowering the pallets P. The control valves 166 and 168 and the foot operated levers 174 can be located at any convenient position at each work station 14 or 22.

Filled bags B are conveyed to both work stations 14 and 22 by a belt conveyor assembly 176. The belt conveyor assembly 176 has a continuous conveyor belt 178 with an upper run that is at the same height as the top of the rear walls 90 and 130 of the first and second bag stacking guides 16 and 24. Bags on the conveyor belt 178 thus are at a level above that of the stacking guides. The conveyor assembly 176 preferably does not have an upper conveyor trough having upstanding sides that would require bags B to be lifted. The bag stackers can merely move the bags B laterally and into the open top of the bag stacking guide 16 or 24. An elevating conveyor 180, partially shown in FIGS. 2 and 3, elevates and conveys bags B from the sewing machine and deposits them on one end of the belt 178. The conveyor assembly 176 is attached to and supported by the frame 12. However, it could be supported by a separate frame if desired. The elevating conveyor assembly 180 is attached to one end or the other of the conveyor assembly 176. The drive for the conveyor assembly 176 drives the belt 178 in the direction which moves the bags away from the conveyor assembly 180.

Figure 5:
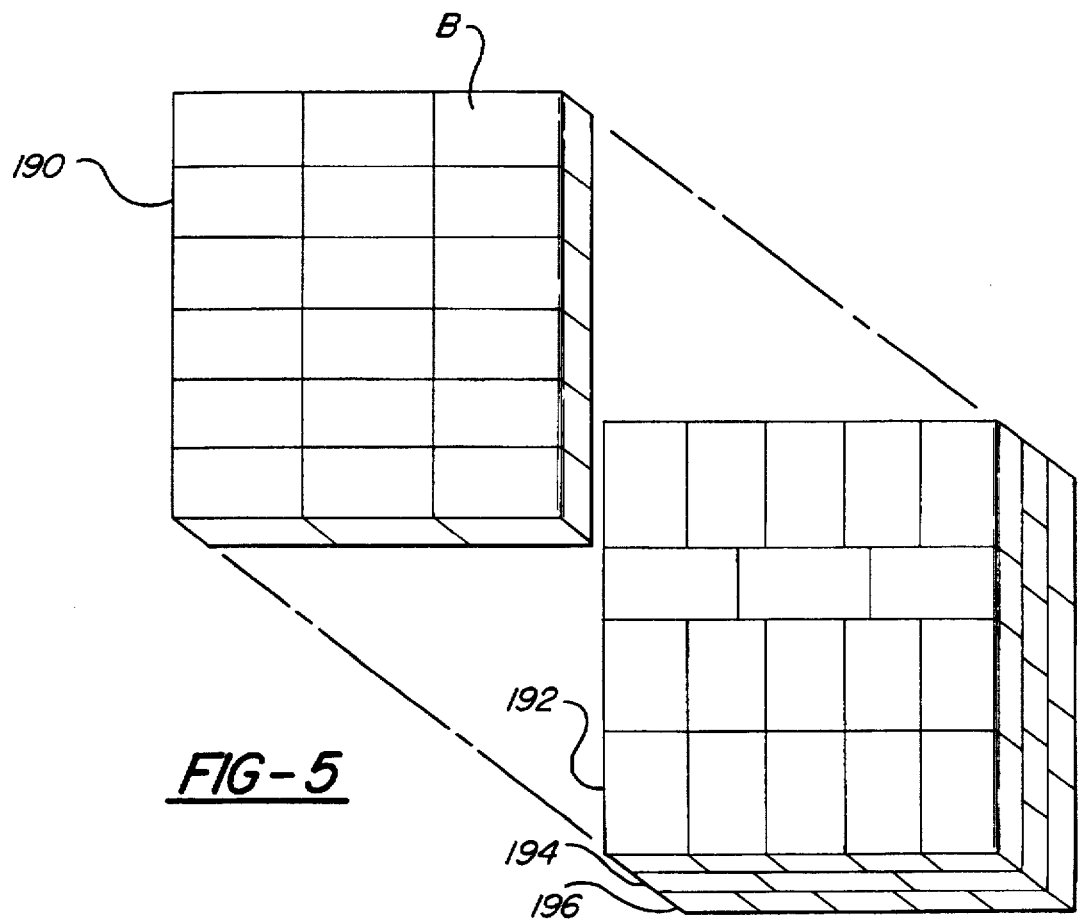
FIG. 5 is an exploded perspective view showing the bag stacking pattern for two bag tiers.

Bags B of potatoes or other products are stacked on the upper, supporting surface of a pallet P to form a lowermost tier of 18 bags, for example. These bags have walls that are not always form-stable but tend to conform to the contour of the potatoes inside. By changing the tier pattern from one tier to another, the bags in adjacent tiers tend to interlock. One tier pattern has three rows of six bags B as illustrated by the first or lowermost tier 190 in FIG. 5. The adjacent tier 192 has two rows of five bags each that are turned 90 degrees from their orientation in the first tier 190, a row of three bags that have the same orientation as the bags in the first tier, and one more row of five bags with the same orientation as the two rows of five bags. A third tier 194 may be identical to the first tier 190.

The fourth tier 196 may be like the second tier 192 except that the locations of the center row of five bags and the row of three bags have been reversed. These, or other selected tier patterns, are repeated until there are up to 250 bags on one pallet P. changing bag size or pallet size will likely require a change in the tier patterns. Tier bag patterns which do not have a bag in one tier directly above an identical bag in the next tier down, will tend to lock together. The top tier is the only tier with bags that are not locked in place from above as well as below.

In operation, pallets P are raised by the first pallet lift mechanism 18 and the second pallet lift mechanism 26 until they are in contact with the bottom surface 96 of all four walls 88, 90, 92 and 94 of the first bag stacking guide 16 and the bottom surface 172 of all four walls 128, 130, 132 and 134 of the second bag stacking guide 24. The bottom surfaces of the walls of each stacking guide are coplanar and define an initial stacking level at which the upper surface of the associated pallet initially is positioned. Bags B are then manually removed from the conveyor belt 178 and transferred to the stacking guides 16 and 24 according to a selected pattern to form one of the tiers 190, 192, or 196 described above. When the first or lowermost tier of bags B is completed, the pallet lift mechanism 18 or 26 is lowered, if necessary, until there is sufficient vertical depth from the top of the bag stacking guide 16 or 24 to the first tier to accommodate one more tier of bags within the guide atop the first tier. The upper surface of the first tier of bags on the pallet will define an adjusted stacking level that is above the level of the initial stacking level. Thus, as each additional tier of bags is loaded on a pallet, the associated bag stacking guide will engage not only a portion of the adjacent lower tier of bags, but also the bags forming the additional tier. Another stacking of bags B is then formed in the bag tier guide 16 or 24 using an alternate bag tier pattern 190, 192 or 196. This procedure is continued until the desired number of bags B are placed in tiers on a pallet P. The bags B should be removed from the conveyor belt 178 so that one pallet P is loaded well before the other pallet. The loaded pallet P is then lowered to the frame 12 and the forks 102 or 138 are lowered to the floor surface 116. A fork lift truck 120 then removes the loaded pallet P from the bag palletizer 10. An empty pallet P is placed in the bag palletizer 10 and the palletizing process repeated. While a full pallet P is being removed, the person on the other work station 14 or 22 must remove and stack all the bags B from the conveyor belt 178. Since the height of each stacking guide 16, 24 is greater than the height of the bags to be stacked on the associated pallet, and since the adjusted stacking level formed by the tops of the uppermost tier of bags is within the confines of the guide 16, 24, the bags of the uppermost tier and the bags being loaded atop the uppermost tier will be engaged by the walls of the associated guide 16, 24 and minimize the possibility that the stacked bags will topple, or be skewed, or extend laterally beyond the edges of the pallet.

While preferred embodiments and methods of the invention have been shown and described other embodiments will now become apparent to those skilled in the art. Accordingly, the invention is not to be limited by that which is shown and described but by the following claims.

I claim:

1. A palletizer for arranging articles in vertical tiers on a pallet having a supporting surface, said palletizer comprising a frame; at least one four sided stacker guide open at its upper and lower ends and forming an enclosure having an area less than that of the supporting surface of said pallet; a lift carried by the frame and underlying said guide for raising a pallet on said lift to form a bottom for said guide and a support for a lowermost tier of said articles and for lowering the pallet as additional tiers are formed atop said lowermost tier; a station stacking zone on the frame adjacent said guide; a lift control operable by a stacker at said zone for controlling raising and lowering of the lift; and an article delivery conveyor for delivering said articles alongside said guide at a level corresponding substantially to that of said guide for manual placement of said articles within the guide, said guide having a height sufficient to provide simultaneous lateral support for the uppermost tier of articles and articles forming an additional tier atop said uppermost tier.

2. A palletizer as set forth in claim 1 including a stop on the frame for limiting the maximum height that said pallet can be raised by the lift.

3. A palletizer as set forth in claim 2 wherein said guide has a bottom surface which constitutes said stop.

4. A palletizer as set forth in claim 1 wherein said guide has a height corresponding to that of 1½ to 2 tiers of said articles.

5. A palletizer as set forth in claim 1 wherein said guide is fixed.

6. A palletizer as set forth in claim 1 wherein said lift is vertically movable a distance sufficient to enable the formation of a selected plurality of tiers of said articles on said pallet.

7. A bag palletizer as set forth in claim 1 wherein the enclosed area of said guide is sufficiently less than that of said supporting surface of said pallet as to preclude any article of a tier from extending beyond said supporting surfaces.

8. A palletizer for stacking articles comprising a frame having a stacking zone; article conveyor means for delivering articles to said stacking zone; a vertically movable lift carried by said frame; an article supporting pallet separably carried by said lift and movable by said lift vertically to and from an article stacking level and said stacking zone at which articles may be stacked on said pallet in tiers, said pallet having an article supporting surface of selected area; and a stacking guide supported by said frame at said stacking zone and overlying said pallet, said guide having upstanding walls defining an enclosure open at its upper and lower ends, said enclosure having an area sufficiently less than the area of said supporting surface that no part of a tier of articles passed through said guide to said pallet extends laterally beyond the latter wherein said walls of said guide have a height sufficiently greater than that of said articles that at least a portion of each of two tiers of said articles may be engaged simultaneously.

9. The palletizer as set forth in claim 8 wherein said guide is fixed on said frame.

* * * * *

UNITED STATES PATENT AND TRADEMARK OFFICE
CERTIFICATE OF CORRECTION

PATENT NO. : 5,791,865
DATED : August 11, 1998
INVENTOR(S) : Rod W. Bublitz

It is certified that error appears in the above-indentified patent and that said Letters Patent is hereby corrected as shown below:

Column 6, line 19, cancel "station."

Signed and Sealed this

Eighth Day of December, 1998

Attest:

BRUCE LEHMAN

Attesting Officer

Commissioner of Patents and Trademarks